(12) United States Patent
Borntrager et al.

(10) Patent No.: US 8,490,727 B2
(45) Date of Patent: Jul. 23, 2013

(54) HYBRID DRIVE TRAIN FOR A MOTOR VEHICLE

(75) Inventors: Kai Borntrager, Langenargen (DE); Bernard Hunold, Friedrichshafen (DE); Max Bachmann, Bad Waldsee (DE); Rene Budach, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 100 days.

(21) Appl. No.: 13/001,739

(22) PCT Filed: Jul. 16, 2009

(86) PCT No.: PCT/EP2009/059145
§ 371 (c)(1),
(2), (4) Date: Dec. 28, 2010

(87) PCT Pub. No.: WO2010/007125
PCT Pub. Date: Jan. 21, 2010

(65) Prior Publication Data
US 2011/0100736 A1 May 5, 2011

(30) Foreign Application Priority Data
Jul. 17, 2008 (DE) .......................... 10 2008 040 497

(51) Int. Cl.
*B60K 6/42* (2007.10)
(52) U.S. Cl.
USPC ..................................... 180/65.22; 180/65.6

(58) Field of Classification Search
USPC ............. 180/65.22, 65.25, 65.6, 65.7, 65.235
See application file for complete search history.

(56) References Cited

U.S. PATENT DOCUMENTS 5,526,714 A * 6/1996 Schierling .................... 464/68.4
6,863,140 B2    3/2005 Noreikat et al.
(Continued)

FOREIGN PATENT DOCUMENTS

DE    100 12 221 A1    10/2001
DE    101 60 466 C1    6/2003
(Continued)

*Primary Examiner* — John Walters
*Assistant Examiner* — Brian Swenson
(74) *Attorney, Agent, or Firm* — Davis & Bujold, PLLC

(57) ABSTRACT

A hybrid drive train for a motor vehicle comprises an internal combustion engine, and electric machine, with a stator and rotor, and a transmission. A disk clutch is located in the force flow, between the combustion engine and the transmission input shaft, and an outer disk carrier of the disk clutch is fixed to a transmission input stage and an inner disk carrier of the disk clutch is connected to the combustion engine. The rotor of the electric machine drives another element of the transmission input stage, and the disk carriers of the clutch are mounted and centered by two roller bearings which center the inner and outer disk carriers relative to one another and bring them into axial alignment, and axial tolerances within the unit which comprises the electric machine, the separator clutch and the transmission input stage are compensated by displacing and aligning the disk packet of the clutch in the drive gearing of the inner disk carrier.

12 Claims, 4 Drawing Sheets

U.S. PATENT DOCUMENTS

| | | |
|---|---|---|
| 7,244,208 B2 | 7/2007 | Bauknecht et al. |
| 7,284,313 B2 * | 10/2007 | Raszkowski et al. ............ 29/596 |
| 7,699,407 B2 * | 4/2010 | Dolger et al. .................... 303/13 |
| 2006/0289209 A1 * | 12/2006 | Grosspietsch et al. ........ 180/65.2 |
| 2007/0007059 A1 | 1/2007 | Nomura et al. |
| 2007/0267270 A1 | 11/2007 | Sudau et al. |
| 2009/0050384 A1 * | 2/2009 | Muller et al. .............. 180/65.21 |
| 2009/0283344 A1 * | 11/2009 | Arnold et al. .............. 180/65.22 |
| 2010/0081537 A1 * | 4/2010 | Sakaue et al. ................. 475/331 |
| 2010/0258366 A1 * | 10/2010 | Kim ................................. 180/15 |

FOREIGN PATENT DOCUMENTS

| | | |
|---|---|---|
| DE | 103 46 640 A1 | 5/2005 |
| DE | 10 2005 053 887 A1 | 5/2007 |
| DE | 10 2007 039 854 A1 | 5/2008 |
| EP | 1 736 345 A1 | 12/2006 |
| EP | 1 857 700 A1 | 11/2007 |
| WO | WO-2008/092426 A2 * | 8/2008 |

* cited by examiner

HYBRID DRIVE TRAIN FOR A MOTOR VEHICLE

This application is a National Stage completion of PCT/EP2009/059145 filed Jul. 16, 2009, which claims priority from German patent application serial no. 10 2008 040 497.7 filed Jul. 17, 2008.

FIELD OF THE INVENTION

The present invention relates to a hybrid drive train for a motor.

BACKGROUND OF THE INVENTION

From the prior art hybrid drive trains for motor vehicles are known, which comprise an internal combustion engine and an electric machine with a rotor and a stator. In addition the known hybrid drive trains comprise a transmission usually in the form of an automatic transmission, and the internal combustion engine can be connected releasably to the input shaft of the transmission by means of a clutch whereas the rotor of the electric machine is connected to the input shaft of the transmission.

For example, DE 103 46640 A1 by the present applicant describes a drive train for a hybrid vehicle, in which an internal combustion engine is in driving connection with a separator clutch whose output side is connected to a transmission input shaft which is connected to an input element of the automatic transmission. In this known drive train the transmission input shaft can also be driven by an electric machine and for that purpose the rotor of the electric machine is connected to the transmission input shaft.

DE 10012221 A1 describes a hybrid drive train in which an internal combustion engine is in driving connection with a separator clutch whose output side is connected to a transmission input shaft itself connected to an input element of an automatic transmission, whereas the rotor of an electric machine is connected to the transmission input shaft via a transmission input stage with a high gear ratio; this brings the advantage that the electric machine can be made smaller since the rotational speed level of the electric machine is decoupled from that of the internal combustion engine and by virtue of the gear ratio, sufficient torque is available for purely electric driving.

It is particularly advantageous for the separator clutch between the internal combustion engine and the transmission input shaft to be a disk clutch whose outer disk carrier is connected rotationally fixed to the planetary carrier of a planetary transmission unit which serves as the transmission input stage and whose inner disk carrier is connected to the internal combustion engine, whereas the rotor of the electric machine drives the ring gear of the planetary transmission unit and the sun gear of the planetary transmission unit is coupled to the housing.

In such transmissions the unit comprising the electric machine, the separator clutch and the transmission input stage also fulfills the functions of a hydrodynamic converter.

SUMMARY OF THE INVENTION

Thus, the purpose of the present invention is to provide a hybrid drive train for a motor vehicle, comprising an internal combustion engine, an electric machine with a stator and a rotor, and a transmission, in which, in the force flow direction between the internal combustion engine and the transmission input shaft a separator clutch in the form of a disk clutch is arranged, whose outer disk carrier is connected in a rotationally fixed manner to an element of a transmission input stage and whose inner disk carrier is connected to the internal combustion engine, in such manner that the rotor of the electric machine drives another element of the transmission input stage, and in which the disk carriers of the separator clutch can be mounted and centered compactly.

Furthermore, axial tolerances within the unit comprising the electric machine, the separator clutch and the transmission input stage should be compensated and an axial force on the transmission input shaft, exerted in conventional drive trains by the hydrodynamic converter, should be produced here as well.

According to these a hybrid drive train for a motor vehicle is proposed, which comprises an internal combustion engine, an electric machine with a stator and a rotor, and a transmission, and in which, in the force flow between the internal combustion engine and the transmission input shaft, is arranged a separator clutch in the form of a disk clutch whose outer disk carrier is connected in a rotationally fixed manner to an element of the transmission input stage and whose inner disk carrier is connected to the internal combustion engine, whereas the rotor of the electric machine drives another element of the transmission input stage, and in which the disk carriers of the separator clutch are mounted and centered by means of two roller bearings preferably in the form of needle bearings, which center the driveshaft of the internal combustion with the inner disk carrier and the planetary carrier with the outer disk carrier relative to one another and bring them into axial alignment.

Preferably, the transmission input stage is in the form of a simple planetary transmission unit, with the outer disk carrier connected to the planetary carrier of the planetary transmission unit and with the rotor of the electric machine driving the ring gear of the planetary transmission unit; the sun gear of the planetary transmission unit is coupled to a housing.

According to the invention, axial tolerances within the unit comprising the electric machine, the separator clutch and the transmission input stage are compensated by displacing or aligning the disk packet in the drive gearing of the inner disk carrier. In a further development of the invention the inner disk carrier is mounted fixed to the housing in a cover, whereas the outer disk carrier is fixed axially on the transmission input shaft with an adjusting washer.

In a particularly advantageous embodiment of the invention, an axial spring is provided on an axial bearing of the transmission input shaft, which prestresses the transmission input shaft relative to the housing. Preferably, the axial spring is a cup spring. In that case the amount by which the spring is prestressed can be adjusted by means of an adjustment washer preferably arranged between the hub of the separator clutch and the transmission input shaft. However, a long spring packet can also be used as the axial spring.

Advantageously, the adjustment washer is arranged between the outer disk carrier of the separator clutch and the transmission input shaft.

BRIEF DESCRIPTION OF THE DRAWINGS

Below, an example of the invention is explained in greater detail with reference to the attached figures, which show:

FIG. 1A is an enlargement of area A of FIG. 1; FIG. 2A is an enlargement of area B of FIG. 2.

DETAILED DESCRIPTION OF THE PREFERRED EMBODIMENTS

Figure 1:
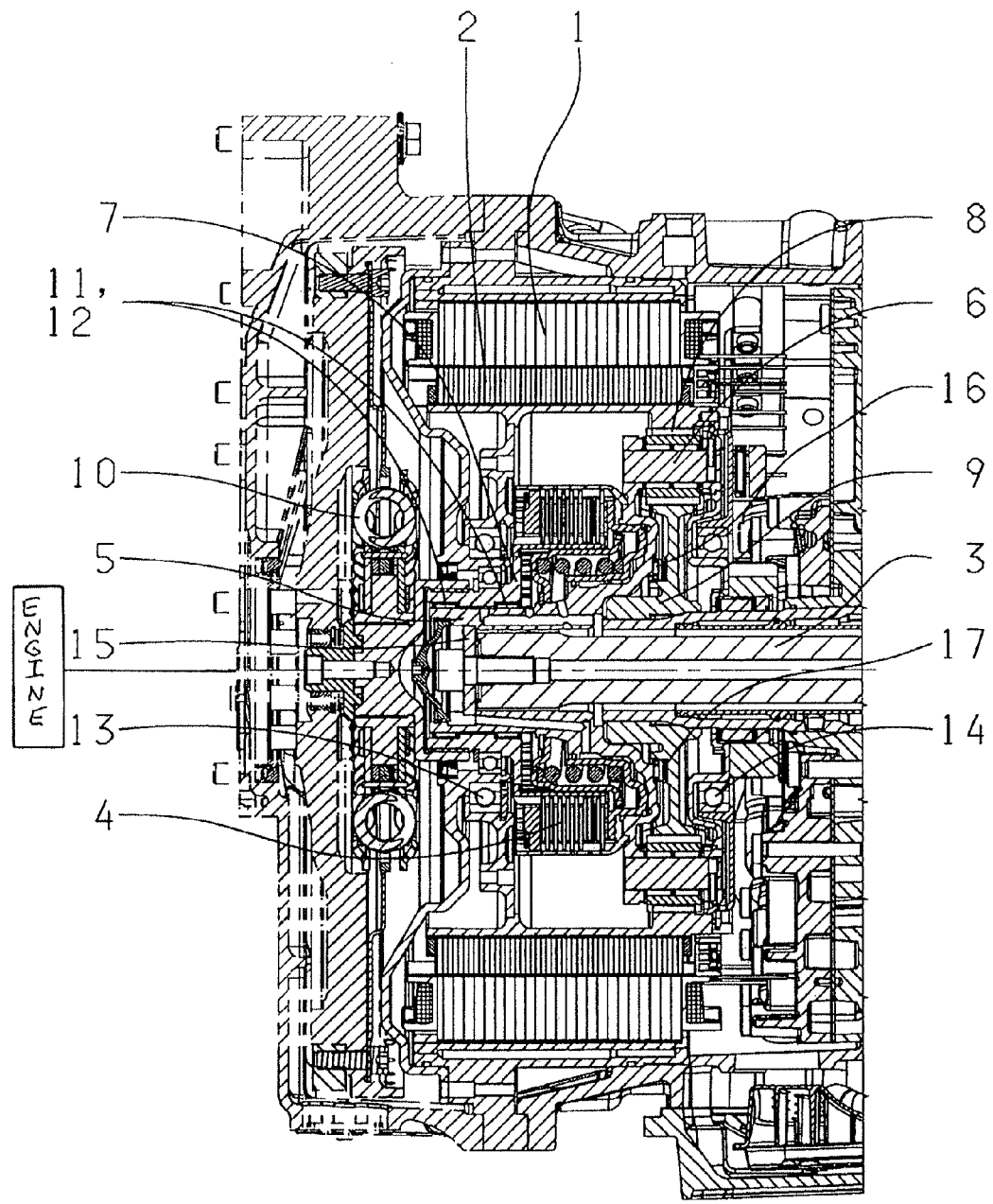
FIG. 1: Sectioned view of the part of a drive train which is relevant to the invention.
Figure 1:
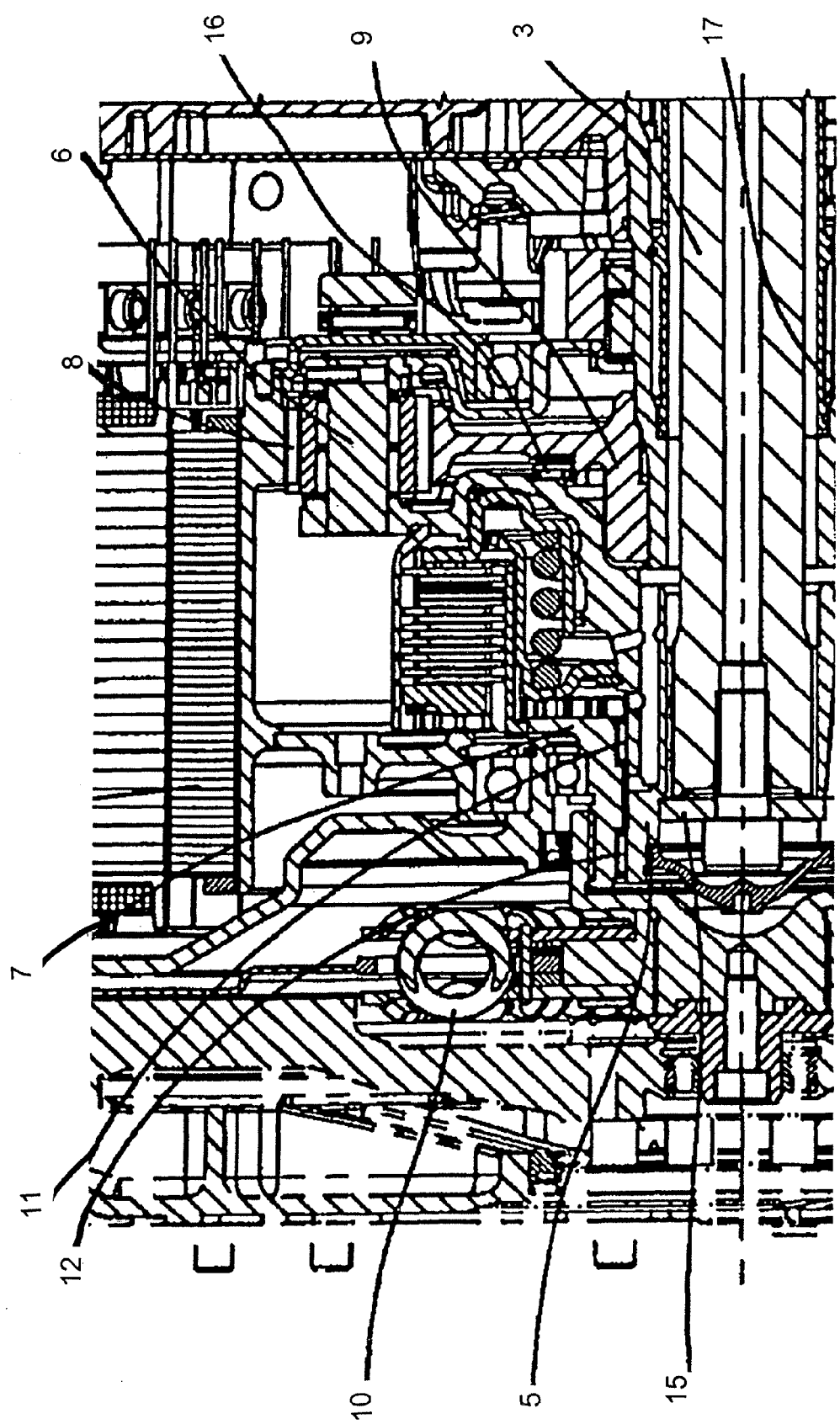

FIG. 1 shows part of a hybrid drive train. It comprises an internal combustion engine (ENGINE), an electric machine preferably designed as an internal-rotor machine with a stator 1 and a rotor 2, and between the internal combustion engine and the transmission input shaft 3 there is arranged a separator clutch 4 in the form of a disk clutch whose outer disk carrier 5 is connected in a rotationally fixed manner to the planetary carrier 6 of a planetary transmission unit serving as the transmission input stage and whose inner disk carrier 7 is connected to the driveshaft of the internal combustion engine.

As can be seen from FIG. 1, the rotor 2 of the electric machine is connected to the ring gear 8 of the planetary transmission unit and the sun gear 9 of the planetary transmission unit is coupled to the housing.

In the example shown, a rotation oscillation damper 10 is arranged between the internal combustion engine and the transmission input stage. According to the invention, the disk carriers 5, 7 of the separator clutch 4 are mounted and centered by means of two roller bearings preferably made as needle bearings 11, 12, which center the inner disk carrier 7 and the outer disk carrier 5 relative to one another and bring them into axial alignment. The needle bearings 11, 12 are arranged on an external cylindrical section of the outer disk carrier 5.

As can be seen from FIG. 1, roller bearings 13, 14 preferably in the form of grooved ball bearings are provided, and in another variant of the invention the bearing 14 can be omitted.

According to the invention, axial tolerances within the unit comprising the electric machine, the separator clutch 4 and the transmission input stage are advantageously compensated by displacing and aligning the disk packet of the separator clutch 4 in the drive gearing of the inner disk carrier 7. This is made possible because the disks of the inner and outer disk carriers can be axially displaced relative to one another.

According to a further development of the invention, the inner disk carrier 7 is mounted fixed on the housing in a cover; according to the invention, the outer disk carrier 5 is axially fixed on the transmission input shaft 3 by means of an adjusting washer 15.

According to the invention, on an axial bearing 16 of the transmission input shaft 3 between the sun gear 9 of the transmission input stage and the outer disk carrier 5 an axial spring 17 is provided, by means of which the transmission input shaft 3 is prestressed relative to the housing; the axial spring 17 is in the form of a cup spring and the degree to which it is prestressed can be adjusted by means of an adjusting washer preferably arranged between the clutch hub of the separator clutch 4 and the transmission input shaft 3.

Figure 2:
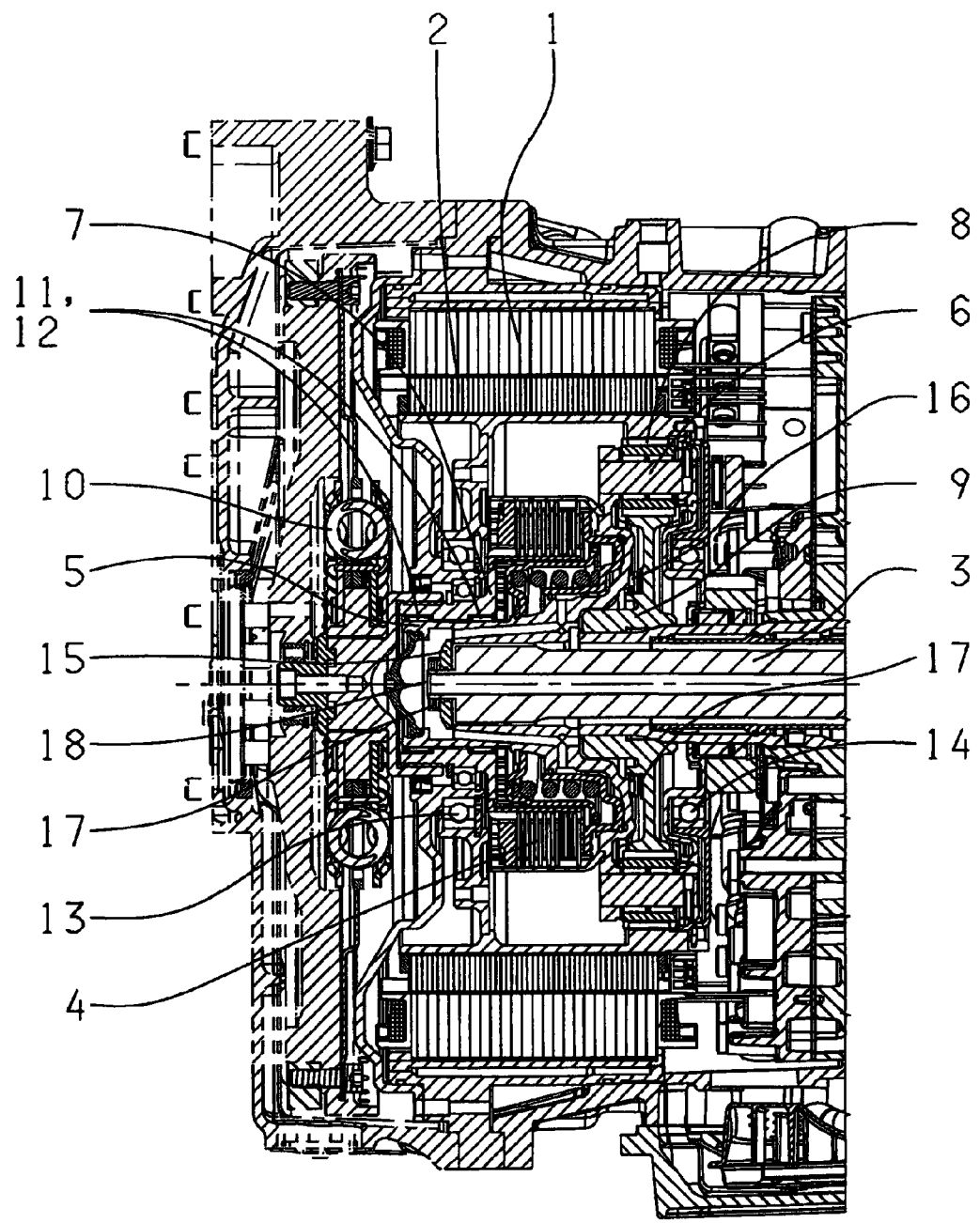
FIG. 2: Another schematic sectioned view of the part of a drive train which is relevant to the invention, illustrating a second embodiment of the invention.
Figure 2:
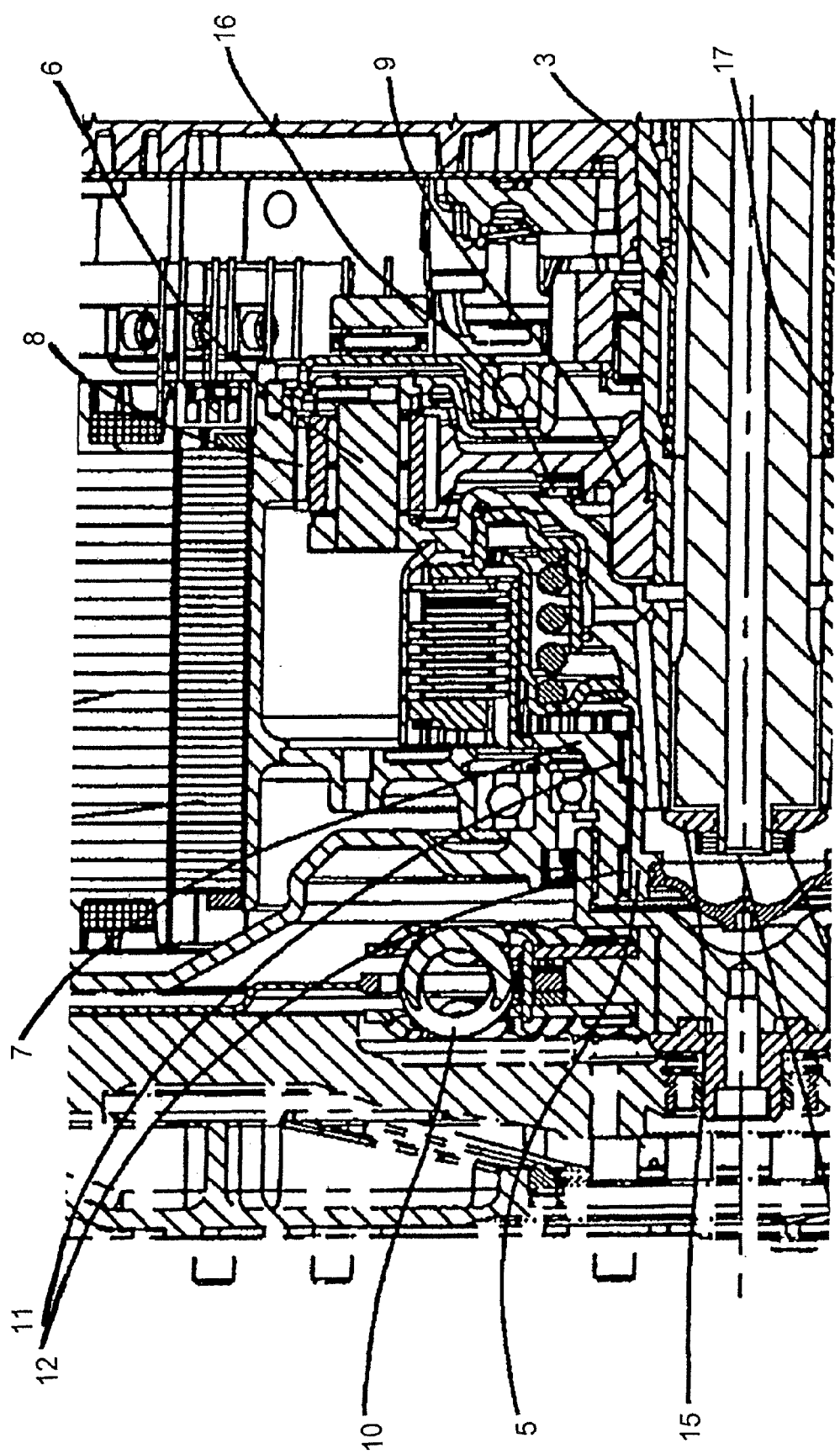

In another embodiment of the invention the axial spring 17 for prestressing the transmission input shaft 3 relative to the housing is arranged between the driving connection 18 of the clutch hub of the separator clutch 4 and the transmission input shaft 3, as can be seen in FIG. 2.

INDEXES

1 Stator
2 Rotor
3 Transmission input shaft
4 Separator clutch
5 Outer disk carrier
6 Planetary carrier
7 Inner disk carrier
8 Ring gear
9 Sun gear
10 Rotation oscillation damper
11 Needle bearing
12 Needle bearing
13 Grooved ball bearing
14 Grooved ball bearing
15 Adjusting washer
16 Axial bearing
17 Axial spring
18 Drive gearing of the clutch hub

The invention claimed is:

1. A hybrid drive train for a motor vehicle, the hybrid drive train comprising:
    an internal combustion engine,
    an electric machine with a stator (1) and a rotor (2), and
    a transmission in which a separator clutch (4), in a form of a disk clutch being arranged in a force flow direction between the internal combustion engine and a transmission input shaft (3), having an outer disk carrier (5) connected in a rotationally fixed manner to an element of a transmission input stage and an inner disk carrier (7) connected to the internal combustion engine,
    the rotor (2) of the electric machine driving another element of the transmission input stage,
    the electric machine, the separator clutch (4) and the transmission input stage comprising an unit,
    the outer and the inner disk carriers (5, 7) of the separator clutch (4) being mounted and centered by two roller bearings (11, 12) which center the inner disk carrier (7) and the outer disk carrier (5) relative to one another and bring the inner and the outer disk carriers (7, 5) into axial alignment, and axial tolerances produced within the unit, during operation of the motor vehicle, being compensated by displacing and aligning a disk packet of the separator clutch (4) in a drive gearing of the inner disk carrier (7);
    wherein the transmission input stage is a planetary transmission unit and the outer disk carrier (5) is connected to a planetary carrier (6) of the planetary transmission unit, the rotor (2) of the electric machine drives a ring gear (8) of the planetary transmission unit and a sun gear (9) of the planetary transmission unit is coupled to a housing.

2. The hybrid drive train for the motor vehicle according to claim 1, wherein the roller bearings (11, 12) are needle bearings.

3. The hybrid drive train for the motor vehicle according to claim 1, wherein the inner disk carrier (7) of the separator clutch (4) is fixedly mounted to the housing in a cover.

4. The hybrid drive train for the motor vehicle according to claim 1, wherein the outer disk carrier (5) of the separator clutch (4) is fixed axially on the transmission input shaft (3) by an adjusting washer.

5. The hybrid drive train for the motor vehicle according to claim 1, wherein an axial spring (17) is provided by which the transmission input shaft (3) is prestressed relative to the housing.

6. The hybrid drive train for the motor vehicle according to claim 5, wherein the axial spring (17) is arranged on an axial bearing (16) of the outer disk carrier (5).

7. The hybrid drive train for the motor vehicle according to claim 5, wherein the axial spring (17) is arranged between a driving connection (18) of a clutch hub of the separator clutch (4) and the transmission input shaft (3).

8. The hybrid drive train for the motor vehicle according to claim 5, wherein the axial spring (17) is a cup spring.

9. The hybrid drive train for the motor vehicle according to claim 5, wherein the axial spring (17) is an elongate spring packet.

10. The hybrid drive train for the motor vehicle according to claim 5, wherein an amount of prestressing of the axial spring (17) is adjustable by an adjusting washer.

11. The hybrid drive train for the motor vehicle according to claim 10, wherein the adjusting washer is arranged between a clutch hub of the separator clutch (4) and the transmission input shaft (3).

12. A hybrid drive train for a motor vehicle, the hybrid drive train comprising:
an internal combustion engine,
an electric machine with a stator (1) and a rotor (2), and
a transmission in which a separator clutch (4), in a form of a disk clutch being arranged in a force flow direction between the internal combustion engine and a transmission input shaft (3), the separator clutch (4) having an outer disk carrier (5) connected, in a rotationally fixed manner, to an element of a transmission input stage and an inner disk carrier (7) connected to the internal combustion engine,
the rotor (2) of the electric machine driving another element of the transmission input stage,
the electric machine, the separator clutch (4) and the transmission input stage comprising a unit,
the outer and the inner disk carriers (5, 7) of the separator clutch (4) being mounted and centered by two roller bearings (11, 12) which center the inner disk carrier (7) and the outer disk carrier (5) relative to one another and bring the inner and the outer disk carriers (7, 5) into axial alignment, disks of the inner and disks of the outer disk carriers being axially displaced, relative to one another, and forming a disk packet, and axial tolerances produced within the unit, during operation of the motor vehicle, being compensated by displacing and aligning the disk packet of the separator clutch (4) in a drive gearing of the inner disk carrier (7);
wherein the transmission input stage is a planetary transmission unit and the outer disk carrier (5) is connected to a planetary carrier (6) of the planetary transmission unit, the rotor (2) of the electric machine drives a ring gear (8) of the planetary transmission unit and a sun gear (9) of the planetary transmission unit is coupled to a housing.

* * * * *